United States Patent [19]

Burack et al.

[11] Patent Number: 4,574,172

[45] Date of Patent: Mar. 4, 1986

[54] BRAZING WAND WITH FIBER OPTIC TEMPERATURE SENSOR

[75] Inventors: Robert D. Burack, Pittsburgh, Pa.; Rudolph W. Brachold, Waldwick, N.J.

[73] Assignee: Westinghouse Electric Corp., Pittsburgh, Pa.

[21] Appl. No.: 602,088

[22] Filed: Apr. 19, 1984

Related U.S. Application Data

[63] Continuation of Ser. No. 324,910, Nov. 25, 1981, abandoned.

[51] Int. Cl.[4] .............................................. H05B 6/38
[52] U.S. Cl. .......................... 219/10.49 R; 219/10.57; 219/10.43; 219/10.79; 219/10.75; 374/131; 356/45
[58] Field of Search ............... 219/10.79, 10.69, 10.71, 219/10.67, 10.57, 10.49 R, 10.75, 10.43, 10.41, 8.5, 10.51, 7.5, 85 A; 350/96.29; 356/44, 45; 374/131, 130, 121

[56] References Cited

U.S. PATENT DOCUMENTS

| 1,986,636 | 1/1935 | Holinger . | |
|---|---|---|---|
| 2,281,334 | 4/1942 | Somes . | |
| 2,501,417 | 3/1950 | Smits et al. . | |
| 2,510,942 | 6/1950 | Albertson, Jr. | 219/10.79 |
| 2,556,236 | 6/1951 | Strickland, Jr. . | |
| 2,759,085 | 8/1956 | Van Iperen | 219/10.41 |
| 3,076,884 | 2/1963 | Crawford | 219/10.79 |
| 3,182,170 | 5/1965 | Rolfes | 219/10.79 |
| 3,376,403 | 4/1968 | Mircea | 219/10.79 X |
| 3,377,565 | 4/1968 | Denner | 219/10.79 X |
| 3,378,917 | 4/1968 | Lapham | 219/10.79 X |
| 3,389,238 | 6/1968 | Shaw | 219/9.5 |
| 3,492,453 | 1/1970 | Hurst | 219/10.49 R |
| 3,560,692 | 2/1971 | Briles | 219/7.5 |
| 3,590,201 | 6/1971 | Basinger | 219/8.5 |
| 3,626,758 | 12/1971 | Stewart et al. | 356/44 X |
| 4,006,337 | 2/1977 | Maxim | 219/8.5 |
| 4,136,566 | 1/1979 | Christensen | 356/44 X |
| 4,222,663 | 9/1980 | Gebhart et al. | 356/45 |
| 4,309,583 | 1/1982 | Krauss et al. | 219/10.79 X |

FOREIGN PATENT DOCUMENTS 917682 7/1954 Fed. Rep. of Germany ... 219/10.79
56-133629 10/1981 Japan .

OTHER PUBLICATIONS

German Article, "Control Device for a Hardening Installation", Peddinghous, Sep. 1970; DE-U-6949043, p. 5, paragraph 2, figure 1.

Primary Examiner—Philip H. Leung
Attorney, Agent, or Firm—L. A. DePaul

[57] ABSTRACT

The brazing wand comprises a hollow helically wound electrically conductive tubular member for conducting an electrical current and for conducting a coolant therethrough. The electrical current is used to heat a member to be brazed while the coolant is used to control the temperature of the brazing wand. The brazing wand also comprises an optical sensing device for determining and controlling the brazing temperature.

11 Claims, 3 Drawing Figures

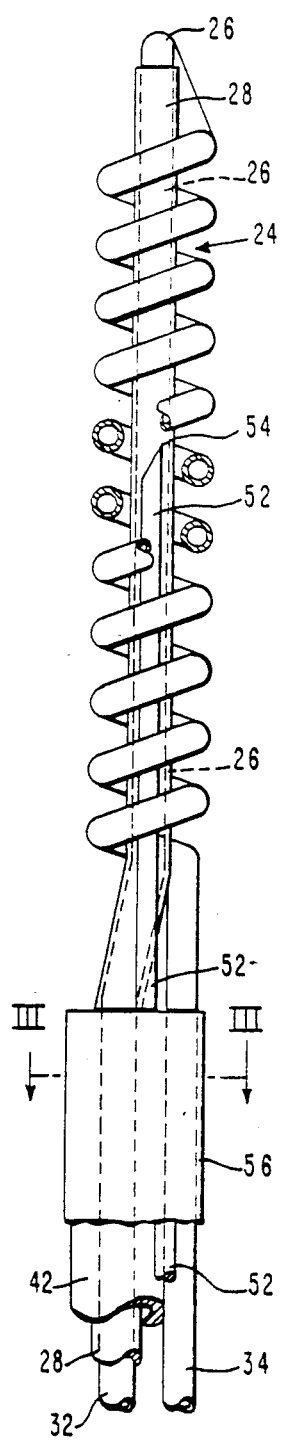
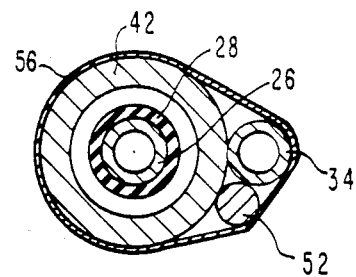
FIG. 3
FIG. 2

BRAZING WAND WITH FIBER OPTIC TEMPERATURE SENSOR

This application is a continuation of application Ser. No. 324,910, filed Nov. 25, 1981, now abandoned.

BACKGROUND OF THE INVENTION

This invention relates to heating apparatus and more particularly to heating apparatus for attaching a sleeve within a tube by a brazing procedure.

In tube-type heat exchangers, a first fluid flows through the tubes of the heat exchanger while a second fluid surrounds the outside of the tubes such that heat exchange occurs between the two fluids. Occasionally, one of the tubes can become defective such that a leak occurs therein which allows the fluids to mingle. When this occurs, it is sometimes necessary to either plug the tube so that the fluid does not flow through the tube or repair the tube, thereby preventing leakage from the tube.

In nuclear reactor power plants, the tube-type heat exchangers are commonly referred to as steam generators. When a defect occurs in a tube of a nuclear steam generator that allows the coolant in the tube to mingle with the coolant outside of the tube, a more significant problem arises. Not only does this situation create an ineffective heat exchanger, but it also creates a radioactive contamination problem. Since the fluid flowing in the tubes of a nuclear steam generator is generally radioactive, it is important that it not be allowed to leak from the tubes and contaminate the fluid surrounding the tubes. Therefore, when a leak occurs in a nuclear steam generator heat exchange tube, the heat exchange tube must either be plugged or repaired so that the coolant does not leak from the tube. This prevents contamination of the fluid surrounding the tubes.

There are several methods known in the art for repairing heat exchange tubes, however, many of these methods are not applicable to repair of heat exchange tubes wherein the tube is not readily accessible. For example, in a nuclear steam generator the physical inaccessibility of defective heat exchange tubes and the radioactive nature of the environment surrounding the heat exchange tubes presents unique problems to repairing heat exchange tubes that do not normally exist in other heat exchangers. For these reasons, special methods have been developed for repairing heat exchange tubes in nuclear steam generators. Typically, the method used to repair a heat exchange tube in a nuclear steam generator is one in which a metal sleeve having an outside diameter slightly smaller than the inside diameter of the defective tube is inserted into the defective tube and attached to the defective tube to bridge the defective area of the tube. This type of repair method is generally referred to as "sleeving". Previous sleeving development work has been concerned with obtaining a relatively leakproof joint between the sleeve and the tube by brazing, arc welding, explosive welding, or other joining means. Due to the need for cleanliness, close fittings, heat application, and atmospheric control, these metallurgical bonding techniques have problems which are not easily solvable in areas such as nuclear steam generators where human access is limited.

In the braze sleeving methods such as the one described in U.S. patent application Ser. No. 185,654, filed Sept. 9, 1980 in the name of R. D. Burack and entitled "Braze Sleeving Method" which is assigned to the Westinghouse Electric Corporation, it is necessary to heat the braze material in order to form the braze bond between the sleeve and the tube. One way to heat the braze material is by inserting a heating apparatus in the sleeve so as to internally heat the sleeve and the braze material. However, due to the inaccessibility of the work area, the power requirements for the heating apparatus, and the need to carefully control the brazing times and temperatures, a specially designed internal brazing wand is recommended for use in such a process.

Therefore, what is needed is a brazing wand capable of being inserted in a heat exchange tube for precisely controlling the temperature and time of the brazing process.

SUMMARY OF THE INVENTION

The brazing wand comprises a hollow helically wound electrically conductive tubular member for conducting an electrical current and for conducting a coolant therethrough. The electrical current is used to heat a member to be brazed while the coolant is used to control the temperature of the brazing wand. The brazing wand also comprises an optical sensing device for determining and controlling the brazing temperature.

BRIEF DESCRIPTION OF THE DRAWINGS

While the specification concludes with claims particularly pointing out and distinctly claiming the subject matter of the invention, it is believed the invention will be better understood from the following description, taken in conjunction with the accompanying drawings, wherein:

FIG. 2 is a partial cross-sectional view in elevation of the brazing wand; and

FIG. 3 is a view along line III—III of FIG. 2.

DESCRIPTION OF THE PREFERRED EMBODIMENTS

Figure 1:
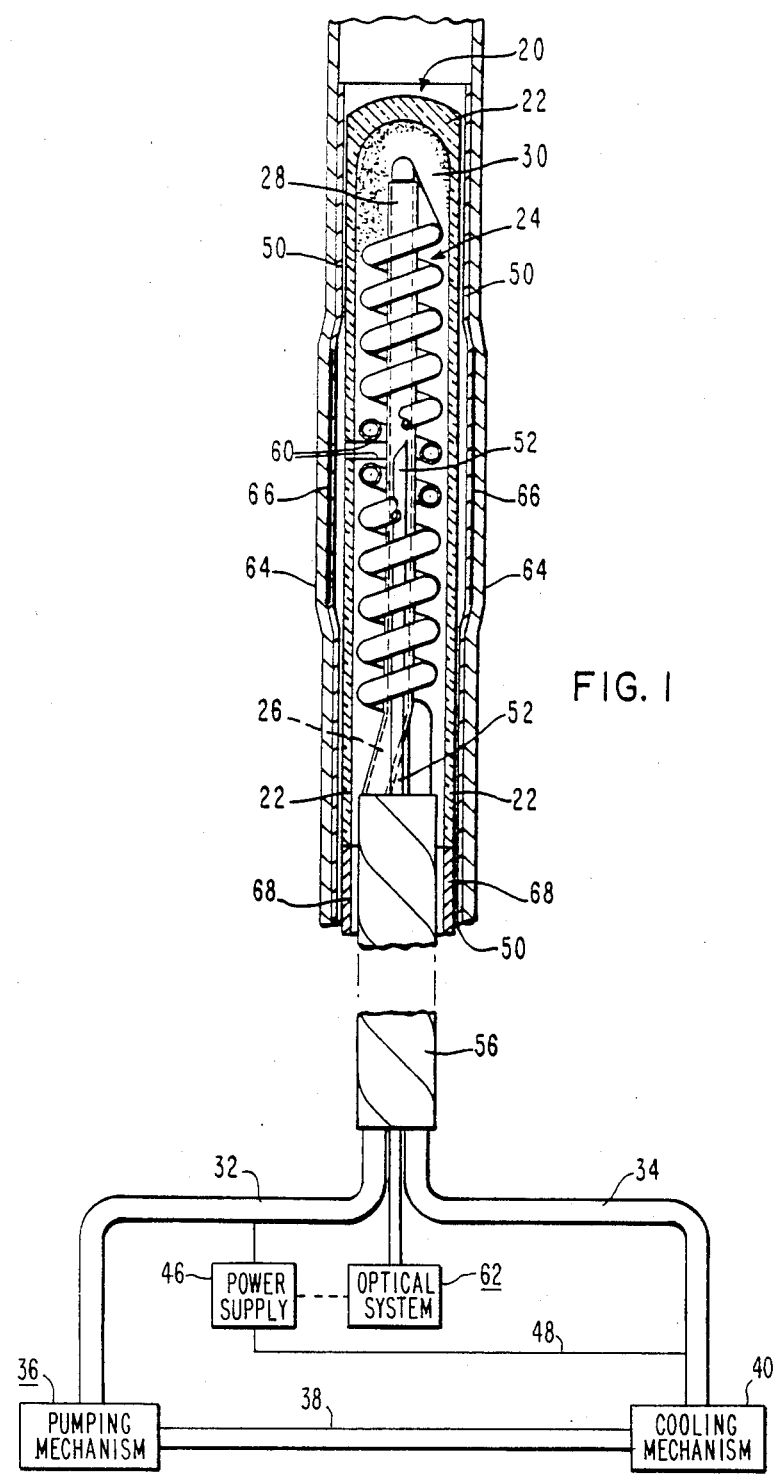
FIG. 1 is a cross-sectional view in elevation of the brazing wand disposed in a tube.

Brazing of sleeves in heat exchange tubes may require the use of internal heating apparatus. The invention described herein is a brazing wand capable of being used to braze sleeves to tubes.

Referring to FIGS. 1–3, the brazing wand is referred to generally as 20 and comprises an external cover 22 which may be a ceramic sheath such as aluminum oxide and serves to protect the internals of brazing wand 20. A coil 24 which may be an electrically conductive copper tube having a 0.25 inch outside diameter and capable of conducting a fluid therethrough is disposed in external cover 22. Coil 24 may be formed to have a substantially straight leg 26 in the center and formed in a helical shape around leg 26. Generally, coil 24 is a continuous tubular member formed as described above for conducting a cooling fluid therethrough such as water and capable of conducting an electrical current through the metal portion thereof. The helical portion of coil 24 may be constructed to be long enough to extend beyond the area to be brazed so as to effectively heat that area. Typically, the helical portion may be approximately 2–5 inches in length, 0.45 inches in diameter, and may have approximately 5–25 turns. Preferably, the helical portion should have approximately 11 turns.

An electrically insulating tubular member 28 such as a Teflon tube is disposed over leg 26 to maintain electrical insulation between leg 26 and the helical portion of coil 24 without interrupting the electrical connection that exists in the metal itself such that electrical current may pass through leg 26 and into the helical portion of coil 24. Tubular member 28 thus prevents short circuiting of the electrical path of coil 24. A packing material 30 such as Sauerisen is disposed in external cover 22 and around coil 24 for maintaining the spacing between the elements in external cover 22 and for providing for stability of those elements.

Leg 26 extends to and becomes first conduit 32 while the other end of coil 24 extends to and becomes second conduit 34. First conduit 32 is connected to pumping mechanism 36 which may be a water pump capable of pumping a coolant such as water at a rate of about 0.25–0.75 gal./min. and at a pressure of about 180–220 psi. Preferably, the coolant is pumped at about 0.5 gal./min. and at about 200 psi. Pumping mechanism 36 which may be located approximately 20 ft. from brazing wand 20 is connected by third conduit 38 to cooling mechanism 40 with cooling mechanism 40 being connected to second conduit 34 thereby completing a closed coolant flow system. Cooling mechanism 40 may be a freon type refrigeration unit and is capable of maintaining the coolant between approximately 50°–100° F. and preferably at about 70° F. Of course, the flow of coolant through the system may be in either direction as long as the coolant acts to maintain coil 24 at a reasonable temperature which is generally about 100° F. The cooling system thereby provides a system for pumping a coolant through coil 24 to maintain the temperature of coil 24 at a reasonable level.

A conductive outer tube 42 which may be copper is placed around tubular member 28 and soldered full length to second conduit 34. With leg 26 (which becomes first conduit 32) covered by tubular member 28 in the region where tubular member 28 is covered by outer tube 42 and with second conduit 34 (which becomes coil 24) soldered to outer tube 42, the combination forms a coaxial power cable for transmitting the electrical power to coil 24. Power lead 44 is connected to first conduit 32 and to power supply 46 and power lead 48 is connected to second conduit 34 and to power supply 46 thereby completing the power circuit for brazing wand 20. Power supply 46 may be a 20 KW RF induction heating power supply capable of operating between 200–400 KHz and preferably at about 250 KHz. Power supply 46 may be chosen from those well known in the art or it may be a modified compact power supply suitable for use at remote locations. In this manner, an electrical current, dissipating approximately 7 KW, flows through leg 26 and coil 24 so as to establish a magnetic field around coil 24 for inducing an electrical current in the member to be brazed thereby heating the member such as sleeve 50.

An optical cable 52 which may be a 0.6 mm. diameter single strand quartz fiber optic cable is disposed inside coil 24 and along tubular member 28 for viewing the light generated by the heating of sleeve 50. Optical cable 52 has a tip 54 which is located approximately midway along the length of coil 24 and is ground at a 45° angle so as to act as a prism to reflect the light along optical cable 52. Optical cable 52 may be attached to outer tube 42 by epoxy and wrapped with insulating tape 56 to hold outer tube 42, second conduit 34 and optical cable 52 in an assembly. Insulating tape 56 also serves to electrically insulate outer tube 42. In addition, external cover 22 and packing material 30 have a bore 60 therein in alignment with tip 54 for conducting light to tip 54.

Optical cable 52 is connected to optical system 62 for detecting the light produced by heating sleeve 50 and thus determining the temperature of sleeve 50. Optical system 62 may also be connected to power supply 46 for automatically adjusting the power of coil 24 to achieve the desired brazing temperature. Optical system 62 may also have a digital display of temperature to enable manual temperature manipulation. Optical system 62 may include a two color pyrometer chosen from those well known in the art, modified to accept a fiber optic input, and is selected because it is not light intensity dependent. Therefore, light intensity variations due to clouding of the optical system will not create temperature variations in optical system 62 readings. An optical system of this type is capable of sensing temperatures in the range of 1300° F. to 2600° F. while coil 24 is capable of generating temperature in sleeve 50 of up to 2500° F.

In addition, a stainless steel tube 68 may be attached to the lower end of external cover 22 and around insulating tape 56.

When it is desired to braze a sleeve 50 to the inside of a heat exchange tube 64, sleeve 50 with braze material 66 thereon is inserted into tube 64 and sleeve 50 is internally expanded into close contact with 64. Then brazing wand 20 is inserted into sleeve 50 so that coil 24 spans the joint to be brazed as shown in FIG. 1. Power supply 46 is then set to the desired power level to produce the desired temperature cycle in the braze material and sleeve 50 which may be approximately 2150° F. Pumping mechanism 36 is also activated which causes the coolant to flow through coil 24. The electrical current flowing through coil 24 establishes a magnetic field around coil 24 which induces an electrical current in sleeve 50 thereby generating heat in sleeve 50 in the area to be brazed. The heat produces light which is sensed by optical cable 52 and relayed to optical system 62 which determines the temperature of sleeve 50. This information is continuously relayed to power supply 46 to continuously adjust the power level to achieve the preprogrammed brazing cycle. The brazing temperature is held for the proper time interval thus completing the brazing process. When complete, brazing wand 20 is deactivated and removed from sleeve 50.

Therefore, the invention provides a brazing wand capable of being inserted in a heat exchange tube for precisely controlling the temperature and time of the brazing process.

We claim as our invention:

1. Internal heating apparatus for use in steam generator heat exchange tubes, comprising:
   an electrically insulating protective member capable of being disposed in a steam generator heat exchange tube;
   a hollow electrically conductive tubular member capable of conducting a fluid therethrough and disposed in said protective member, said tubular member having a substantially straight leg and having a portion thereof helically wound around a portion of said straight leg forming an induction coil for heating said tube;
   a single strand quartz fiber optic cable disposed within said coil for detecting the temperature of said tube
   a two color pyrometer connected to said fiber optic cable for determining the temperature of said tube; and a power supply electrically connected to said tubular member for supplying an electrical current to said tubular member.

2. The internal heating apparatus according to claim 1 wherein said apparatus further comprises:

a tubular electrically insulating material disposed around said straight leg for electrically insulating said straight leg; and a conductive outer tube disposed around a portion of said insulating material and a portion of said straight leg.

3. The internal heating apparatus according to claim 2 wherein the end of said tubular member opposite said straight leg is formed into a substantially straight portion and attached to the outside of said outer tube forming a coaxial electrical conductor.

4. The internal heating apparatus according to claim 3 wherein the end of said fiber optic cable disposed within said coil is formed into a 45° angle tip for reflecting light along said fiber optic cable.

5. The internal heating apparatus according to claim 4 wherein said protective member has a bore therein for allowing light to enter and impinge on said fiber optic cable.

6. The internal heating apparatus according to claim 5 wherein said coil has between approximately 5-25 turns.

7. The internal heating apparatus according to claim 6 wherein said coil has between approximately 10-12 turns.

8. The internal heating apparatus according to claim 7 wherein said power supply comprises a 20 KW RF induction heating power supply.

9. The internal heating apparatus according to claim 8 wherein said power supply further comprises a 200-400 KHz power supply.

10. The internal heating apparatus according to claim 9 wherein said apparatus further comprises a cooling mechanism connected to said tubular member for cooling the fluid conducted therethrough.

11. The internal heating apparatus according to claim 10 wherein said apparatus further comprises a pumping mechanism connected to said tubular member for pumping said fluid through said tubular member.

* * * * *